United States Patent
Drzewiecki et al.

(10) Patent No.: US 9,875,184 B2
(45) Date of Patent: Jan. 23, 2018

(54) MULTI-LEVEL SNAPSHOT CACHING

(71) Applicant: VMware, Inc., Palo Alto, CA (US)

(72) Inventors: Adrian Drzewiecki, Mountain View, CA (US); Christoph Klee, Snoqualmie, WA (US)

(73) Assignee: VMware, Inc., Palo Alto, CA (US)

( * ) Notice: Subject to any disclaimer, the term of this patent is extended or adjusted under 35 U.S.C. 154(b) by 295 days.

(21) Appl. No.: 14/645,733

(22) Filed: Mar. 12, 2015

(65) Prior Publication Data

US 2016/0266842 A1    Sep. 15, 2016

(51) Int. Cl.
*G06F 12/00*    (2006.01)
*G06F 12/0802*    (2016.01)

(52) U.S. Cl.
CPC .... *G06F 12/0802* (2013.01); *G06F 2212/224* (2013.01)

(58) Field of Classification Search
CPC ........... G06F 2212/224; G06F 12/0802; G06F 3/0674; G06F 3/0614; G06F 3/0647
See application file for complete search history.

(56) References Cited

U.S. PATENT DOCUMENTS

| | | | | |
|---|---|---|---|---|
| 5,774,643 A | * | 6/1998 | Lubbers | G06F 11/1076 711/114 |
| 7,644,108 B1 | * | 1/2010 | Malmskog | G06F 17/30902 709/203 |
| 2010/0095073 A1 | * | 4/2010 | Caulkins | G06F 12/0866 711/154 |
| 2010/0228913 A1 | * | 9/2010 | Czezatke | G06F 11/1451 711/112 |

OTHER PUBLICATIONS

Wei Zhang, et al., "Multi-level Selective Deduplication for VM Snapshots in Cloud Storage", Cloud Computing (Cloud), 2012 IEEE 5th International Conference on Cloud Computing, Jun. 24-29, 2012, 8 pages.

* cited by examiner

*Primary Examiner* — Larry T Mackall
(74) *Attorney, Agent, or Firm* — Patterson & Sheridan LLP (57) ABSTRACT

A method for processing a read request comprises intercepting a read request that includes a logical block address (LBA) of the storage device by an IO filter driver and retrieving a disk identifier (ID) associated with the LBA from a metadata file associated with the storage device. The method further comprises sending the LBA and the disk ID to a daemon configured to read and write to a cache. If the daemon returns cached data associated with the LBA and the disk ID, the method returns the cached data in response to the read request. If the daemon does not return cached data associated with the LBA and the disk ID, the method transmits the read request to the storage device.

18 Claims, 5 Drawing Sheets

MULTI-LEVEL SNAPSHOT CACHING

BACKGROUND

In virtual computing environments, backups can be created by taking snapshots of virtual disk images. A snapshot preserves the contents of the virtual disk at a certain point in time. Multiple snapshots may be created and stored to preserve the contents at different points in time. In addition, one or more redo logs may be created for each snapshot. The redo logs are metadata structures that keep track of the changes made to a disk since the snapshot was taken. In many cases, only a small portion of the disk may change from one redo log to the next.

A virtual computing environment may use a cache to speed up input-output operations (IOs) from one or more virtual machines (VMs). The cache is often a high-speed storage device, such as a solid state drive (SSD). Because the virtual computing environment may have multiple virtual machines, multiple snapshots, and multiple redo logs, caching data for each of these without an intelligent caching scheme would result in a large amount of redundant data being stored in the cache.

DETAILED DESCRIPTION

A virtual disk for a VM may consist of a collection of files stored on an underlying file system. For example, the virtual disk may contain a metadata file, referred to herein as the "descriptor file," and at least one data file, referred to herein as the "extent file." The extent file stores the virtual disk's data, which is accessible to the VM. The descriptor file contains metadata accessible to the host's core virtualization stack for management of the extent file. For example, the descriptor file points to one or more extent files to indicate which extent files belong to the virtual disk and to provide the layout of a virtual disk. The descriptor and extent files for a virtual disk are migrated, cloned, and otherwise copied together.

Virtual disk filters are plug-ins/pluggable code modules that are able to intercept and, if applicable, modify VM requests directed to corresponding virtual disks owned by the VMs. In doing so, these filters may use and/or create data/metadata that needs to be stored. Filter data shouldn't be simply stored in a global location because it must be able to be easily migrated, cloned, and otherwise copied along with the virtual disk. Virtual disk I/O filters, however, may create too much data/metadata to be stored in the descriptor file. For example, a filter may require many megabytes or even gigabytes of storage space (e.g., for caching or storage of hashes), but a typical descriptor file is very small, on the order of a few kilobytes. Ballooning the size of the descriptor file to accommodate I/O filter data would severely impact performance and maintainability of the virtual disk. Additionally, such metadata should not be stored in the extent file, which may be limited to the VM's data.

The I/O filter framework allows for each plug-in to own another metadata file (sometimes known as a sidecar file) on a file system associated with the corresponding virtual disk. As described above, a virtual disk includes descriptor and extent files. The sidecar file is separate from the descriptor and extent files and the framework tracks the sidecar file using an entry in the disk's descriptor file. The framework presents an application programming interface (API) to plug-ins for creating or otherwise accessing sidecar files. The API further allows for discovery, migration, cloning, creating a snapshot, and other management of sidecar files, e.g., in response to the migration, cloning, creating a snapshot, or other management event for a corresponding virtual disk.

According to embodiments, the metadata file (sidecar file) associated with an IO caching filter stores information that tracks which snapshot or redo log last modified a particular block in the high-speed cache. With this information, the IO caching filter can more efficiently execute a read IO from a virtual machine to the high-speed cache. In addition, the caching of redundant data in the high-speed cache is reduced.

Figure 1:
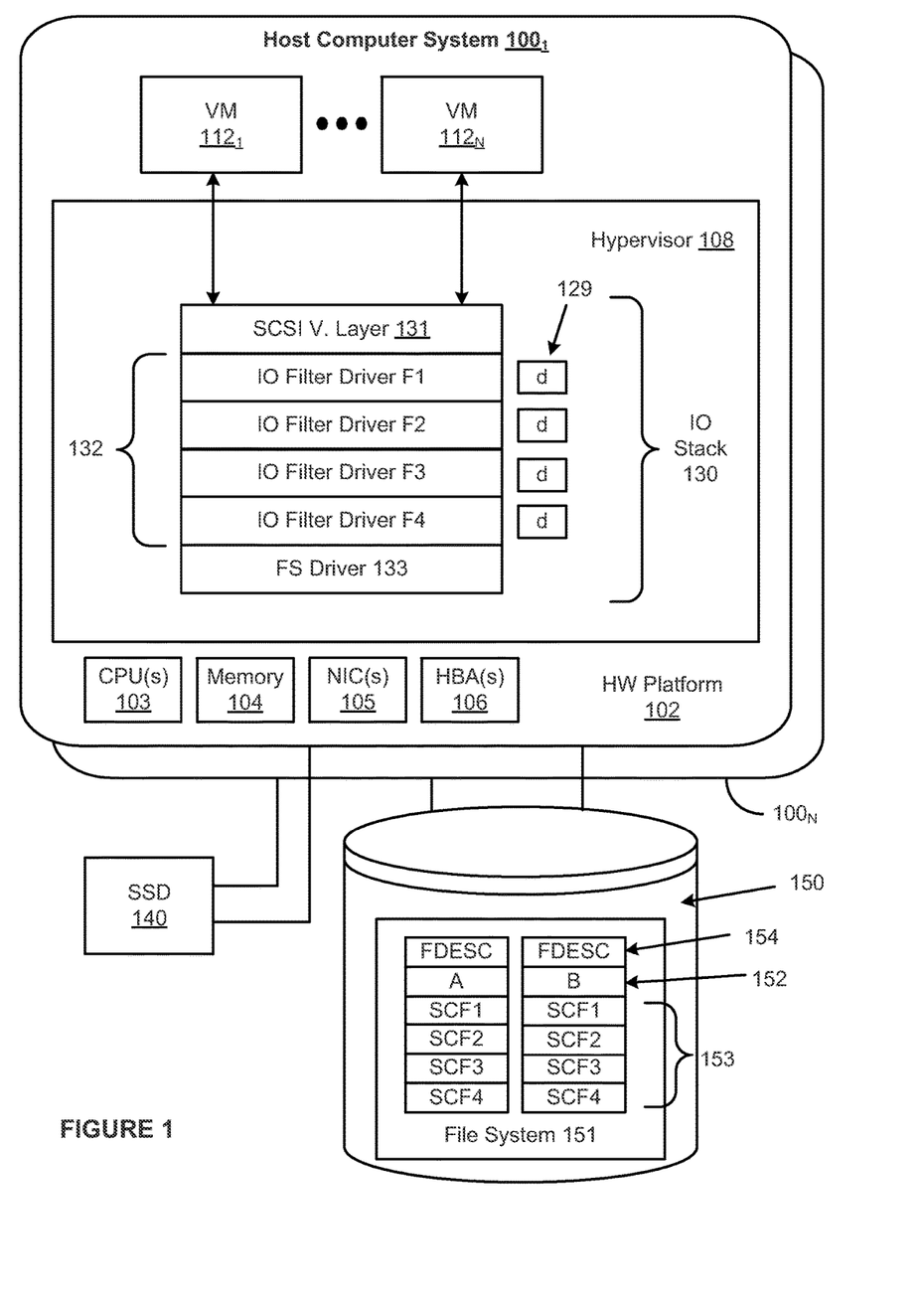
FIG. 1 is a computer system having an operating system that employs an IO caching filter.

FIG. 1 is a computer system, shown as host computer system $100_1$, having virtualization software, referred to herein as hypervisor 108. Host computer system $100_1$ may be constructed on a conventional, typically server-class, hardware platform 102, and includes one or more central processing units (CPUs) 103, system memory 104, one or more network interface controllers (NICs) 105 that connect host computer 100 to a network, and one or more host bus adapters (HBAs) 106 that connect host computer 102 to a persistent storage unit, illustrated herein as storage device 150. Persistent storage may be provided locally in host computer $100_1$ or through the network by a networked-attached storage device. Other host computing systems up to $100_N$ comprise similar components as those illustrated for host computing system 1001.

As further shown in FIG. 1, hypervisor 108 is installed on top of hardware platform 102 and supports the execution of virtual computing instances. In the embodiment illustrated herein, the virtual computing instances are virtual machines (VMs) $112_1$-$112_N$. These virtual machines may each have an associated virtual disk provisioned in storage device 150 such as virtual disks 152. Input-output operations (IOs) issued by the VMs are processed through IO stack 130 of hypervisor 108.

In the embodiments, computer system 100 also employs a high-speed data cache 140. The high-speed data cache 140 is used to execute disk IO at a higher speed than performing IO using storage device 150.

At the top of IO stack 130 is a SCSI virtualization layer 131, which receives IOs from the VMs targeting the issuing VM's virtual disk and translates them into IOs directed at one or more files managed by hypervisor 108, e.g., virtual disk files representing the issuing VM's virtual disk.

Hypervisor 108 employs filter drivers 132 that are external to a file system driver 133 of the hypervisor (e.g., virtual machine file system (VMFS) driver) to provide various IO filter functions, such as encryption, compression, caching (e.g., write-back caching), antivirus, and others. Filter drivers 132 examine the translated IOs from SCSI virtualization layer 131 and intercept read/write command and data for processing in various filters, such as encryption or compression filters. Filter drivers 132, illustrated here as F1, F2, F3, and F4, can each have an associated daemon 129 as illustrated.

One filter used in this example embodiment is an IO caching filter. The IO caching filter intercepts IOs from virtual machines 112 intended for storage device 150 and reads from or writes to cache 140. For example, the IO caching filter intercepts a write IO from a virtual machine 112, writes the data to cache 140, and acknowledges the write IO. For a read IO, the IO caching filter will intercept the read IO and check cache 140 to see if the requested data is stored there. If it is, the data is read from cache 140 and returned to the application. If the data is not in cache 140, IO caching filter allows the read IO to be passed through IO stack 130 to storage device 150. A daemon 129 corresponding to the IO filter is used to perform the actual reads from and writes to cache 140 and also to perform de-staging operations from cache 140 to corresponding virtual disk files in storage device 150.

As explained in further detail below, snapshots and redo logs will have data associated with them that is stored in cache 140. Snapshots and redo logs preserve the contents of a disk at a specific point in time. When a read IO for a block of data is received by the caching filter, the most recent version of that block of data needs to be returned. This read IO has a logical block address (LBA) of the requested data associated with it. If there are multiple redo logs, the caching filter and its corresponding daemon need to determine which redo log last modified that particular block of data. This is accomplished by tracking, within the metadata file (sidecar) associated with the IO caching filter, which redo log last modified each block of data. The ID of that redo log, along with the LBA of the requested data, are used by the daemon to retrieve the data from the cache 140. If the data is not located in cache 140, the daemon retrieves the data from storage device 150.

As illustrated in FIG. 1, each filter has an associated metadata file 153. The metadata files 153 (illustrated as SCF1-SCF4 for each disk) are stored alongside and associated with the virtual disks 152. The virtual disk labeled "A" in FIG. 1 may be a virtual disk associated with $VM_1$ (i.e., VM1.vmdk). The virtual disk labeled "B" may be a virtual disk associated with another VM, such as $VM_2$ (i.e. VM2.vmdk). In addition to metadata files 153, file descriptors 154 are stored alongside and associated with virtual disks 152.

The various terms, layers and categorizations used to describe the components in FIG. 1 may be referred to differently without departing from their functionality or the spirit or scope of the invention.

Figure 2A:
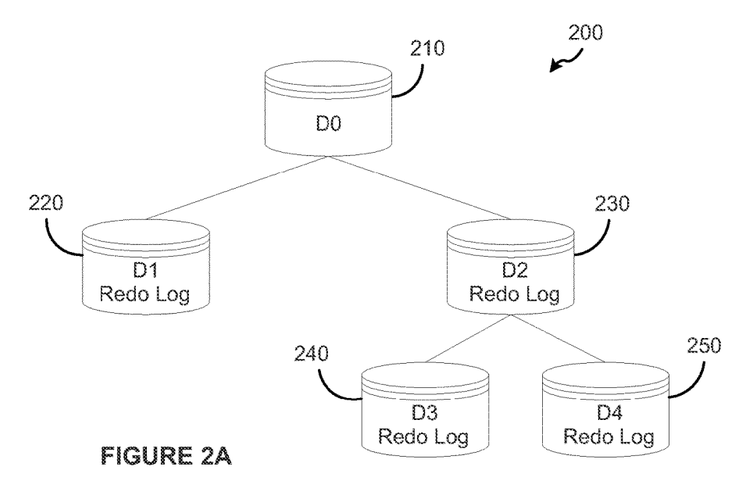
FIG. 2A is a conceptual diagram illustrating a base disk and redo logs.

FIG. 2A is a conceptual diagram illustrating a base disk D0 and a tree of redo logs D1-D4. Redo logs are used to track the data that has changed from the base disk. As an example, a base disk may be read-only, and one or more virtual disks can be cloned from the base disk. Redo logs track the changes made to the base disk by various users while preserving the base disk. As shown, redo logs D1 and D2 track the changes from the base disk D0. Also, redo logs D3 and D4 track the changes between those logs and D2. The redo logs are identified by unique identifiers.

Figure 2B:
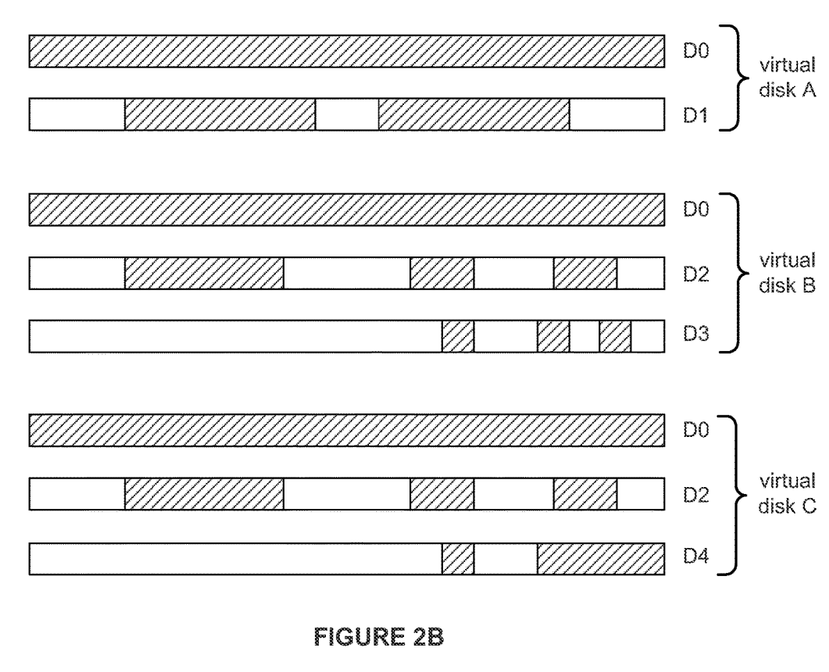
FIG. 2B illustrates multiple virtual disks and redo logs associated with each of the virtual disks.

FIG. 2B illustrates an example portion of data associated with multiple virtual disks and redo logs associated with each of the virtual disks. Virtual disks A, B, and C may be clones of a base disk D0. The data in base disk D0 is preserved for each virtual disk. Changes are tracked using redo logs D1 to D4. For example, at the top of FIG. 2B, the shaded areas in redo log D1 illustrates the portions of data that have been updated from the base disk D0. Similarly, for virtual disk B, the shaded areas in redo log D2 illustrate the data that has been updated from the base disk D0. In addition, redo log D3 for virtual disk B illustrates the data that has been changed from redo log D2 (see, e.g., the hierarchy shown in FIG. 2A). Redo log D4 is associated with virtual disk C and illustrates the portions of data that have been updated from redo log D2.

The storage space for the base disk and each redo log is specified using LBA, from LBA 0 to LBA Max. When data is cached in cache 140, the IO caching filter and its associated daemon track the LBA associated with that data and its disk ID. The daemon also tracks the location where the data is stored in the cache 140 so that the data can be retrieved by the daemon from cache 140 in response to a subsequent read operation. Data stored in the cache 140 is uniquely identified by its disk identifier and LBA.

Figure 3:
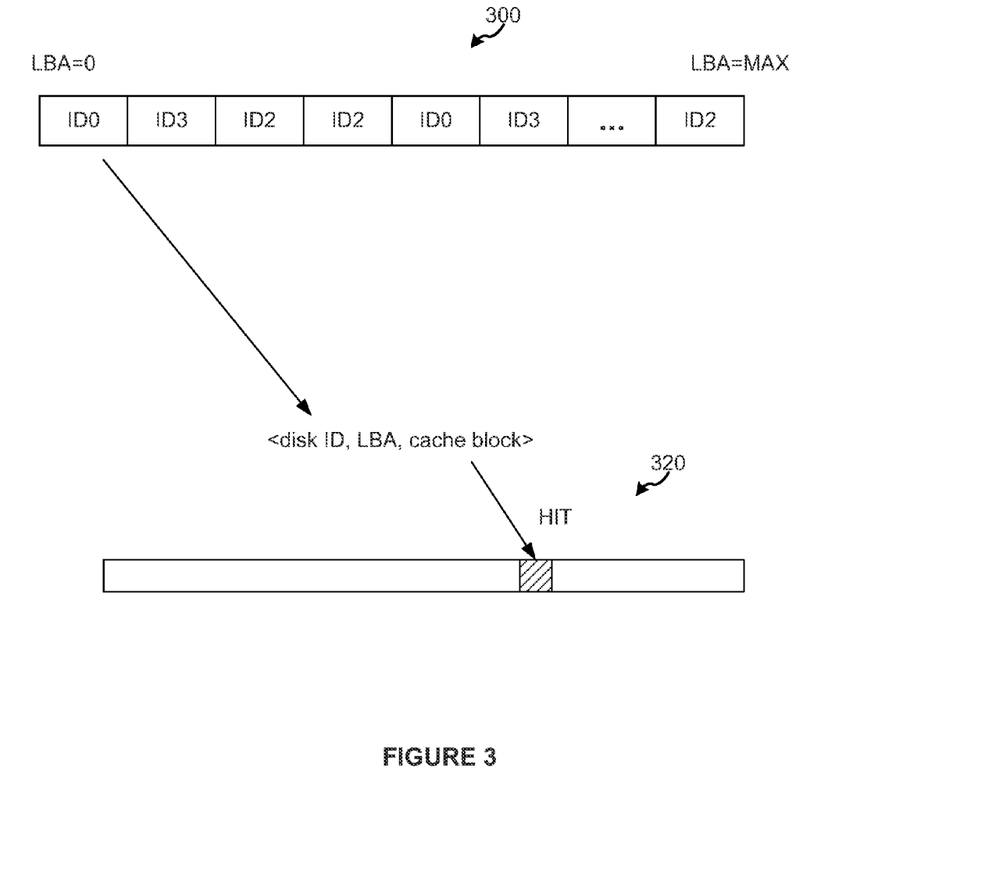
FIG. 3 illustrates a metadata file for an IO caching filter and an index to the metadata file.

FIG. 3 illustrates a metadata file 300 for an IO caching filter and an index 310 to the metadata file. The metadata file 300 is also referred to as a "sidecar" file and is associated with the IO caching filter. The metadata file is divided into blocks corresponding to the blocks of a disk specified using LBA, from LBA 0 to LBA Max. Virtual disk B from FIG. 2B is used as an example. The metadata file 300 stores the disk ID of the redo log that last modified the data at that particular LBA. For example, for LBA 0 in FIG. 3, ID0 is specified. This means the redo log denoted by ID0 last modified the data at LBA 0. For LBA 1, ID3 is specified. This means the redo log or snapshot denoted by ID3 last modified the data at LBA 1. Other examples are shown in metadata file 300.

A block of data stored in memory may be modified by a write IO. When IO caching filter intercepts a write IO, IO caching filter receives the disk ID associated with that write IO and writes that disk ID to the appropriate LBA in metadata file 300. IO caching filter also passes the data to be written, the disk ID, and the LBA to its corresponding daemon so that the daemon can write the data to SSD 140. Now, the metadata file 300 has stored the identity of the disk that last modified the data at a specific LBA. If the data at that LBA is modified in the future by a different disk ID, IO caching filter will update the metadata file 300 with the new disk ID at the corresponding LBA. Metadata file 300 therefore tracks which redo log last modified the data stored at each LBA.

When IO caching filter receives a read IO, the read IO includes an LBA. IO caching filter accesses the metadata file 300 to retrieve the disk ID of the redo log that last modified the data stored at that LBA. The retrieved disk ID and the LBA are then passed to the daemon corresponding to the IO caching filter, as shown at the bottom of FIG. 3. The daemon retrieves the data from shared cache 320 using the disk ID and LBA if there is a cache hit (as shown), and then returns the data to the IO caching filter. If the data is not found in shared cache 320, (i.e., a cache miss) the daemon retrieves the data from the physical disk 150.

Figure 4:
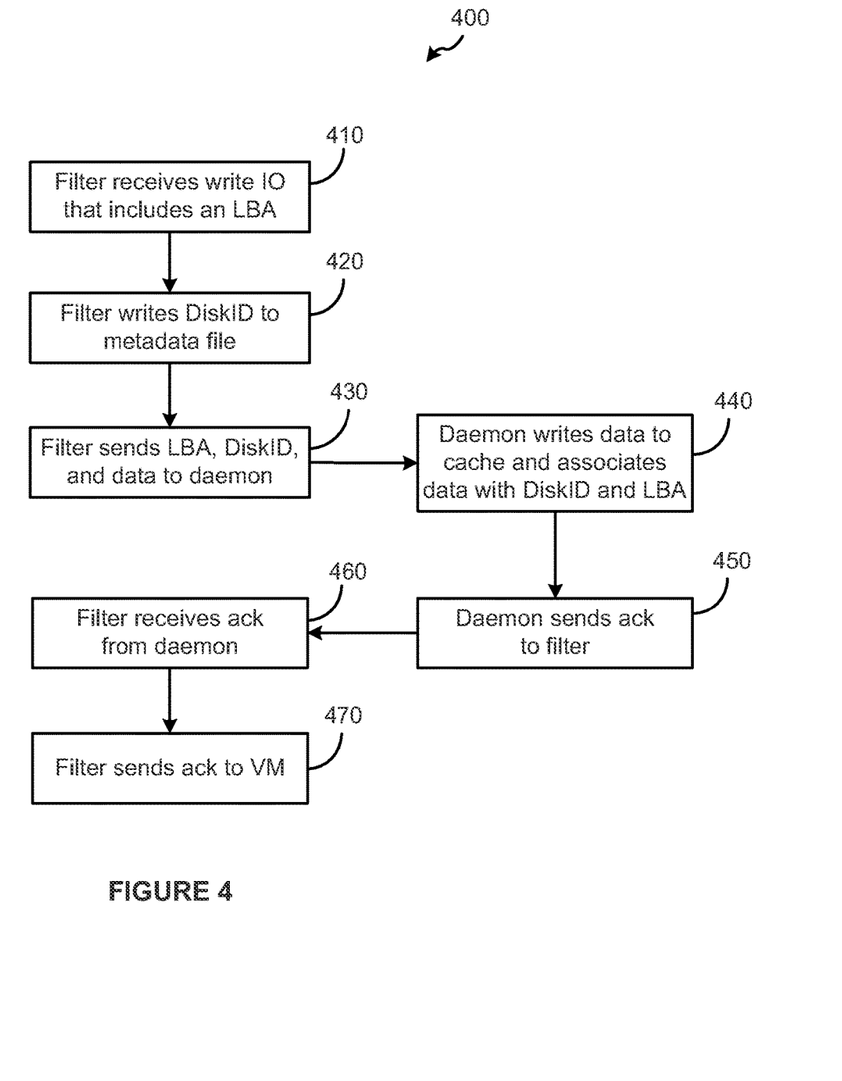
FIG. 4 is a flow diagram that illustrates a method of writing data to a cache with an IO caching filter.

FIG. 4 is a flow diagram that illustrates a method 400 of writing data to a cache with an IO caching filter. The steps in method 400 are executed by the IO caching filter and its associated daemon. The method begins at step 410, where a write IO is intercepted by the IO caching filter. The write IO includes not only the data to be written to storage but also the DiskID and the LBA associated with the data.

At step 420, the caching filter writes the DiskID to the metadata file associated with the caching filter. The DiskID is written to the portion of the metadata file corresponding to the LBA included with the write IO. Writing the DiskID to the metadata file in the portion corresponding to this LBA informs the caching filter and its daemon that this DiskID last modified this particular LBA block.

At step 430, the caching filter sends the DiskID, the LBA, and the data to the daemon to write to the cache. At step 440, the daemon writes the data to the cache and associates that block of data with the DiskID and LBA. If this data is requested in the future, the daemon will locate this data using that DiskID and LBA.

At step 450, the daemon sends an acknowledgement to the caching filter that the data has been written. At step 460, the caching filter receives that acknowledgement from the daemon. Finally, at step 470, the caching filter sends an acknowledgement to the computing instance that issued the write IO.

Figure 5:
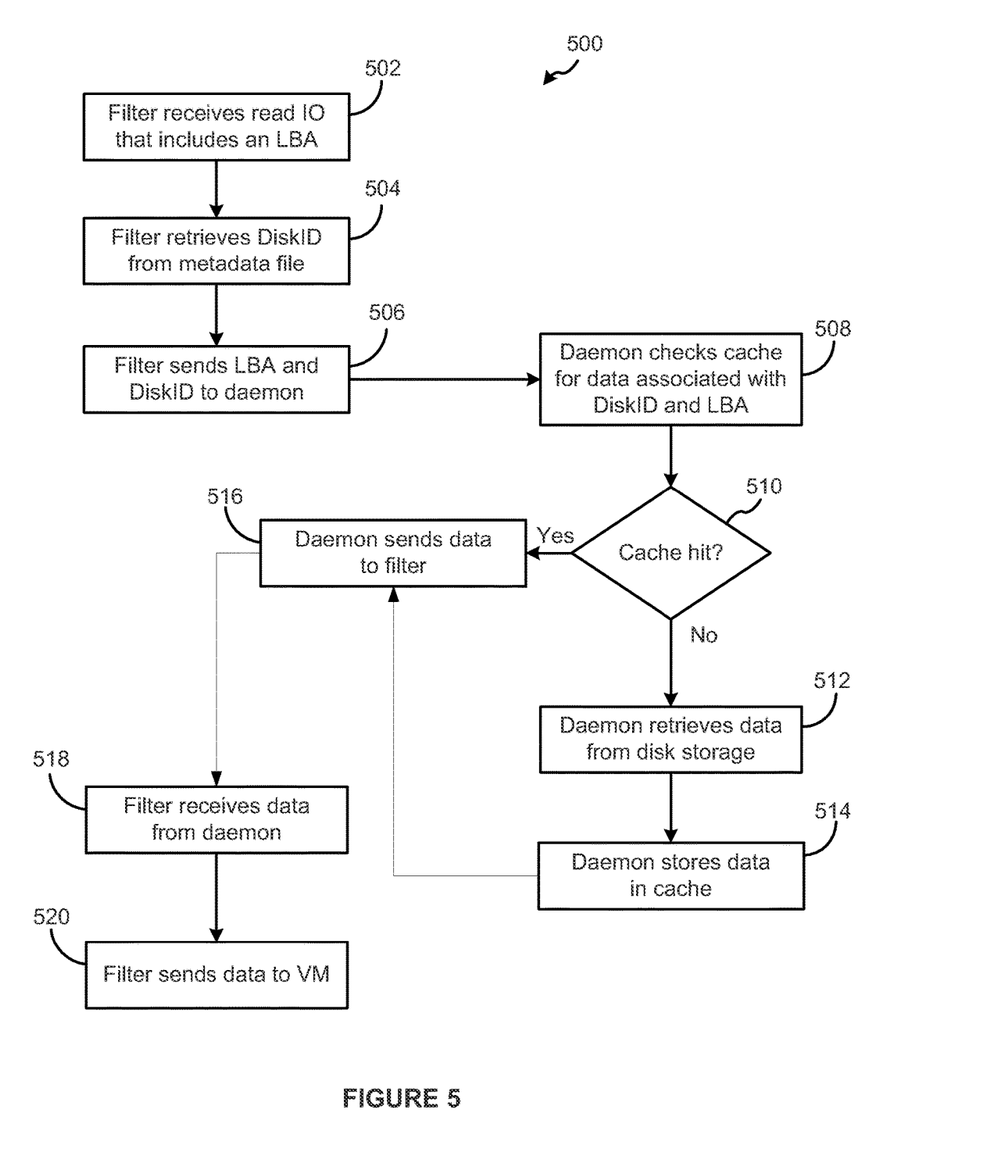
FIG. 5 is a flow diagram that illustrates a method of reading data with an IO caching filter.

FIG. 5 is a flow diagram that illustrates a method 500 of reading data with an IO caching filter. The steps in method 500 are executed by the IO caching filter and its associated daemon. The data may be read from either a cache or disk storage.

The method begins at step 502, where the caching filter intercepts a read IO. The read IO includes an LBA from which to retrieve the data. At step 504, the caching filter accesses its metadata file and retrieves the DiskID stored in the metadata file that is associated with this LBA. The DiskID identifies the redo log that last modified this particular block.

At step 506, the caching filter sends the LBA and the DiskID to the daemon associated with the caching filter. The daemon will use this information to locate the requested data. At step 508, the daemon checks the cache for the data associated with the DiskID and LBA. The daemon manages the cache, and as noted above with respect to FIG. 4, if the data is stored in the cache the DiskID and LBA are associated with the data.

At step 510, the daemon determines if the data is located in the cache. If the data is not currently stored in the cache, the daemon retrieves the data from disk storage as shown at step 512. At step 514, the daemon writes the data to the cache, and associates the DiskID and LBA with the data for facilitating future read operations. Then the method proceeds to step 516, where the daemon sends the data to the caching filter. Alternatively, the daemon may send the data to the caching filter first and then write the data to the cache.

If the data was already stored in the cache and the result of step 510 is a cache hit, the daemon retrieves the data from the cache and sends the data to the caching filter, as shown in step 516. At step 518, the caching filter receives the data from the daemon. Finally, at step 520 the caching filter sends the data to the computing instance that issued the read IO.

One advantage of the above described embodiments is that data can be more quickly retrieved from the cache. The daemon that retrieves data from the cache does not have to check multiple redo logs (denoted by their respective disk IDs) to determine which redo log last modified a particular block of data. Instead, the IO caching filter provides the correct disk ID to the daemon. Another advantage is the use of the index for the redo logs in order to save space in the metadata file.

In the embodiments described above, a base disk and redo logs are given as examples of multi-level snapshots. In further embodiments, the multi-level snapshots may be virtual volume based snapshots or storage array based snapshots. In addition, the embodiments are described with a persistent cache, but in alternative embodiments, a volatile memory device may be used as a cache so long as the cache existed prior to taking of the snapshots.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A non-transitory computer readable medium comprising instructions that are executed in a computer system to carry out a method for processing a read request to a storage device, said method comprising:
    intercepting a read request that includes a logical block address (LBA) of the storage device by an IO filter driver;
    retrieving a disk identifier (ID) associated with the LBA from a metadata file associated with the storage device and associated with the IO filter driver;
    sending the LBA and the disk ID to a daemon associated with the IO filter driver and configured to read from and write to a cache;
    if the daemon returns cached data associated with the LBA and the disk ID, returning the cached data in response to the read request; and
    if the daemon does not return cached data associated with the LBA and the disk ID, transmitting the read request to the storage device.

2. The non-transitory computer-readable medium of claim 1, wherein the storage device includes a base disk and one or more redo logs, wherein the base disk and one or more redo logs each has a unique disk ID.

3. The non-transitory computer-readable medium of claim 1, wherein transmitting the read request to the storage device further comprises returning the data from the storage device in response to the read request.

4. The non-transitory computer-readable medium of claim 3, further comprising storing the data in the cache and associating the data in the cache with the disk ID and the LBA.

5. The non-transitory computer readable medium of claim 1, further comprising:
    intercepting a write request that includes a second LBA of the storage device by the IO filter driver;
    writing a disk ID associated with the write request to the metadata file associated with the storage device;
    sending the disk ID associated with the write request, the second LBA, and write data to the daemon;
    writing the write data to the cache.

6. The non-transitory computer readable medium of claim 5, wherein the daemon associates the write data with the second LBA and the disk ID associated with the write request.

7. A method for processing a read request, comprising:
    intercepting a read request that includes a logical block address (LBA) of the storage device by an IO filter driver;
    retrieving a disk identifier (ID) associated with the LBA from a metadata file associated with the storage device and associated with the IO filter driver;
    sending the LBA and the disk ID to a daemon associated with the IO filter driver and configured to read from and write to a cache;
    if the daemon returns cached data associated with the LBA and the disk ID, returning the cached data in response to the read request; and
    if the daemon does not return cached data associated with the LBA and the disk ID, transmitting the read request to the storage device.

8. The method of claim 7, wherein the storage device includes a base disk and one or more redo logs, wherein the base disk and one or more redo logs each has a unique disk ID.

9. The method of claim 7, wherein transmitting the read request to the storage device further comprises returning the data from the storage device in response to the read request.

10. The method of claim 9, further comprising storing the data in the cache and associating the data in the cache with the disk ID and the LBA.

11. The method of claim 7, further comprising:
    intercepting a write request that includes a second LBA of the storage device by the IO filter driver;
    writing a disk ID associated with the write request to the metadata file associated with the storage device;
    sending the disk ID associated with the write request, the second LBA, and write data to the daemon;
    writing the write data to the cache.

12. The method of claim 11, wherein the daemon associates the write data with the second LBA and the disk ID associated with the write request.

13. An apparatus, comprising:
a processing unit; and
a memory coupled to the processing unit, the memory storing instructions which, when executed by the processing unit, cause the processing unit to:
intercept a read request that includes a logical block address (LBA) of the storage device by an IO filter driver;
retrieve a disk identifier (ID) associated with the LBA from a metadata file associated with the storage device and associated with the IO filter driver;
send the LBA and the disk ID to a daemon associated with the IO filter driver and configured to read from and write to a cache;
if the daemon returns cached data associated with the LBA and the disk ID, return the cached data in response to the read request; and
if the daemon does not return cached data associated with the LBA and the disk ID, transmit the read request to the storage device.

14. The apparatus of claim 13, wherein the storage device includes a base disk and one or more redo logs, wherein the base disk and one or more redo logs each has a unique disk ID.

15. The apparatus of claim 13, wherein transmitting the read request to the storage device further comprises returning the data from the storage device in response to the read request.

16. The apparatus of claim 15, further comprising storing the data in the cache and associating the data in the cache with the disk ID and the LBA.

17. The apparatus of claim 13, wherein the instructions further cause the processing unit to:
intercept a write request that includes a second LBA of the storage device by the IO filter driver;
write a disk ID associated with the write request to the metadata file associated with the storage device;
send the disk ID associated with the write request, the second LBA, and write data to the daemon;
write the write data to the cache.

18. The apparatus of claim 17, wherein the daemon associates the write data with the second LBA and the disk ID associated with the write request.

* * * * *